W. H. Jennison,
Water Filter,
N° 9,760. Patented May 31, 1853.

Witnesses:
A. de P. Baez
Lemuel W. Serrell

Inventor:
W. H. Jennison

UNITED STATES PATENT OFFICE.

WM. H. JENNISON, OF NEW YORK, N. Y., ASSIGNOR TO CHARLES MILLINGTON AND JNO. JORDAN; ELIZA MILLINGTON, EXECUTRIX, AND W. S. TOOLE, EXECUTOR OF CHAS. MILLINGTON, DECEASED, AND JOHN JORDAN, ASSIGNORS TO JAMES M. PARKER.

COMPOSITION FOR FILTERS.

Specification of Letters Patent No. 9,760, dated May 31, 1853.

*To all whom it may concern:*

Be it known that I, WILLIAM H. JENNISON, of the city, county, and State of New York, have invented, made, and applied to use a new and useful Composition for Filtering Mediums for Use in Filters for Cleansing or Purifying Water or other Liquids; and I do hereby declare that the following is a full, clear, and exact description of the composition of which said filtering medium is composed.

I take bone black or animal charcoal in particles about the size of coarse gun powder, thirty-one pounds more or less and mix the same well and evenly with about sixty-two pounds of finely ground glass. These proportions by measure will be about sixty-six parts of animal charcoal to forty-four parts of glass. When these substances are thoroughly mixed together in a dry state, I add to the same boiled starch of about the ordinary thickness, sufficient in quantity to cause the particles to adhere together, and be to a certain extent plastic; in this state the composition is to be molded into the desired shape of the filtering medium, in any proper mold and dried in the shade. This composition thus formed is then to be submitted to sufficient heat to vitrify the same, the particles of glass melting and cementing the particles of phosphate of lime together, thus forming a porous hard medium that does not require any support from wire gauze or perforated plates within the filter.

It will be understood that the process of vitrifying burns up the starch which is merely to hold the particles together, and also that the animal matter in the charcoal is driven off leaving only the porous organic substance, which is phosphate of lime, combined with the glass.

In the accompanying drawing one mode of applying this medium is shown to illustrate the manner in which the same is used.

Figure 1:
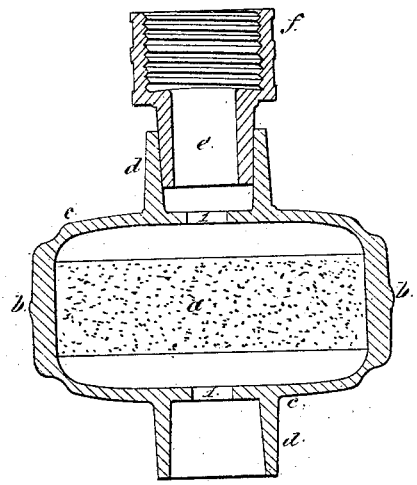
Figure 2:
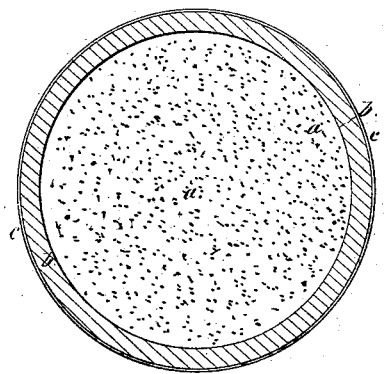

Figure 1, is a vertical section, and Fig. 2, is a sectional plan of the filtering medium in a case.

The like marks designate the same parts.

$a$, is the filtering medium which is herein shown as inclosed in a gutta percha case $c$. This case is to be formed in two halves and the parts of the sides of the case are to be made plastic by heat and being set together around the medium form a point with each other, and while in a plastic state the gutta percha is to be squeezed by rings or other means around the sides into the porous sides of the medium to form a water tight joint with the same.

$f$, is a screw coupling to be attached to the pipe supplying the liquid to be filtered.

$e$, is a socket on the coupling $f$.

$d$, $d$, are sockets one on each side of the case $c$, with a hole $l$, to pass the liquid into the case; by this means the filter may be reversed for cleansing; the sockets $d$, and $e$, adhering together by friction and atmospheric pressure.

Although I have shown herein the above described form of filter I do not limit the application of this filtering medium or composition to any size form or character of filter but to use this composition wherever it may be available.

The proportions of ingredients may be varied, as by using more animal charcoal and less glass the medium will be more porous, and vice versa. In all cases the finer the glass is ground and the more even the size of the particles of carbon the more regular and even the medium will be.

Clay or other substances may be used to cement the particles of glass and animal charcoal together prior to burning, although I prefer the starch as herein described.

I am not aware that a composition for a filtering medium has ever been made by the vitrification of animal charcoal and glass, therefore What I desire to secure by Letters Patent is—

The composition of animal charcoal glass and starch or its equivalent, treated in the manner set forth, for a filtering composition as specified.

In testimony whereof I have hereunto set my signature this twentieth day of September one thousand eight hundred and fifty two.

WM. H. JENNISON.

Witnesses:
A. DE P. BAEZ,
LEMUEL W. SERRELL.